(12) United States Patent
Hebbecker et al.

(10) Patent No.: US 11,118,656 B2
(45) Date of Patent: Sep. 14, 2021

(54) LINK CHAIN, IN PARTICULAR BUSH CHAIN

(71) Applicant: Ketten-Wulf Betriebs-GmbH, Eslohe-Kuckelheim (DE)

(72) Inventors: Thomas Hebbecker, Kirchhundem (DE); Christian Hanemann, Meschede (DE); Frank Padberg, Schmallenberg (DE); Stefan Kemper, Meschede (DE)

(73) Assignee: Ketten Wulf Betriebs GmbH, Eslohe-Kückelheim (DE)

( * ) Notice: Subject to any disclaimer, the term of this patent is extended or adjusted under 35 U.S.C. 154(b) by 485 days.

(21) Appl. No.: 15/776,122

(22) PCT Filed: Nov. 24, 2016

(86) PCT No.: PCT/EP2016/078706
§ 371 (c)(1),
(2) Date: May 15, 2018

(87) PCT Pub. No.: WO2017/089478
PCT Pub. Date: Jun. 1, 2017

(65) Prior Publication Data
US 2018/0328450 A1    Nov. 15, 2018

(30) Foreign Application Priority Data

Nov. 25, 2015    (DE) .......................... 102015120382.0

(51) Int. Cl.
*F16G 13/06*    (2006.01)
*F16H 57/05*    (2006.01)
(Continued)

(52) U.S. Cl.
CPC ............. *F16G 13/06* (2013.01); *B65G 17/06* (2013.01); *F16C 33/1065* (2013.01);
(Continued)

(58) Field of Classification Search
CPC ..... F16G 13/06; B65G 17/06; F16C 33/1065; F16C 2326/58; F16H 5/0469; F16H 57/05
See application file for complete search history.

(56) References Cited

U.S. PATENT DOCUMENTS 4,328,665 A * 5/1982 Taubert .................. F16G 13/06
29/415
9,003,758 B2 * 4/2015 Bodensteiner .......... F16G 13/02
59/35.1
(Continued)

FOREIGN PATENT DOCUMENTS

CA    2621514 A1    3/2007
DE    2726033 A1    12/1977
(Continued)

OTHER PUBLICATIONS

Office Action in corresponding Chinese Patent Application No. 201680068906.4, dated Apr. 26, 2020, with English translation.
(Continued)

*Primary Examiner* — Michael R Mansen
*Assistant Examiner* — Robert T Reese
(74) *Attorney, Agent, or Firm* — Edell, Shapiro & Finnan, LLC

(57) ABSTRACT

A link chain, in particular bush chain, comprising an inner link plate with a bush, an outer link plate with a pin, wherein the pin and bush form a chain joint, wherein a sealing arrangement is provided for sealing the chain joint, wherein the sealing arrangement is arranged between the inner link plate and the outer link plate, and wherein the sealing arrangement comprises a seal and a seal-accommodating space, characterized in that in that the seal-accommodating space is formed from a thrust washer and an annular cutout, in particular in the outer link plate, wherein a ring, which is designed in the form of a metal ring, is arranged in the
(Continued)

seal-accommodating space, or in that the seal-accommodating space is formed from a thrust washer and an accommodating washer.

14 Claims, 6 Drawing Sheets

(51) Int. Cl.
*B65G 17/06* (2006.01)
*F16C 33/10* (2006.01)
*F16H 57/04* (2010.01)

(52) U.S. Cl.
CPC ......... *F16H 57/0469* (2013.01); *F16H 57/05* (2013.01); *F16C 2326/58* (2013.01)

(56) References Cited

U.S. PATENT DOCUMENTS

| | | | | |
|---|---|---|---|---|
| 2008/0124015 | A1* | 5/2008 | Fujiwara | F16G 13/06 384/484 |
| 2008/0131040 | A1* | 6/2008 | Fujiwara | F16C 33/76 384/127 |
| 2009/0301842 | A1* | 12/2009 | Ono | F16G 13/06 198/500 |
| 2010/0081528 | A1* | 4/2010 | Yamane | B65G 45/08 474/91 |
| 2011/0294616 | A1 | 12/2011 | Fujiwara | |

FOREIGN PATENT DOCUMENTS

| | | |
|---|---|---|
| DE | 3629591 A1 | 3/1988 |
| DE | 19918703 A1 | 11/2000 |
| EP | 0601469 A1 | 6/1994 |
| JP | 54145845 A | 11/1979 |
| JP | 8-200452 A | 8/1996 |
| JP | 2001-090790 A | 4/2001 |
| JP | 2003-314628 A | 11/2003 |
| JP | 2003314628 A | 11/2003 |
| JP | 2005-76681 A | 3/2005 |
| JP | 2005076681 A | 3/2005 |
| JP | 2010-242954 A | 10/2010 |
| JP | 2011-252536 A | 12/2011 |
| JP | 05-100794 B2 | 12/2012 |
| JP | 2013-133926 A | 7/2013 |
| JP | 2013133926 A | 7/2013 |

OTHER PUBLICATIONS

International Search Report for corresponding PCT Application No. PCT/EP2016/078706, 4 pages, dated Feb. 22, 2017.
Office Action in corresponding Japanese Patent Application No. 2018-527174, dated Sep. 29, 2020, with English translation.
Office Action in corresponding Australian Patent Application No. 2016360772, dated Oct. 23, 2020.
Office Action in corresponding Chinese Patent Application No. 201680068906.4, dated Dec. 3, 2020, with English translation.
Office Action in corresponding Japanese Patent Application No. 2018-527174, dated Jan. 26, 2021, with English translation.

* cited by examiner

LINK CHAIN, IN PARTICULAR BUSH CHAIN

FIELD OF THE INVENTION

The present invention relates to a link chain, in particular a bush chain, preferably a conveyor chain, as described herein.

BACKGROUND

A link chain, in particular a bush chain, is constructed essentially from two elements which are lined up beside one another in an endless manner. These elements are also referred to as an inner link and outer link. An outer link usually comprises two outer link plates, which are fixed to one another by two pins. An inner link is usually made up of two inner link plates and two bushes, which along with the pins of the adjacent outer links form a respective chain joint. These joints allow the link chain for example to wrap around the chain wheels located in the drive train.

In addition to numerous other applications, link chains lend themselves to be used as a conveyor chain, wherein rollers are fitted on the extended pins or the bushes and the link plates, or at least some link plates, are intended to be connected to add-on parts, for example platforms. For this purpose, the link plates are designed, for example, in the form of angled link plates which, alongside the actual link plate, have an extension arm, to which the add-on parts can be connected. This results, in cross section, in a for example L-shaped link plate.

In the case of various articles and raw materials being conveyed, the link chains are subjected to the action of the article itself and to the influences of the environment and surroundings. It is possible here for dirt and other substances and liquids to penetrate into the chain joint and contribute there to relatively quick and increased wear.

It is therefore often the case in such cases that chain joints are sealed. A construction of a corresponding link chain or sealing arrangement has been disclosed, for example, by DE 2726033 A1 or DE 3629591 A1.

It can be seen in FIG. 1 of DE 2726033 A1 that the sealing lip of a seal outlined there butts, and provides sealing, against the end side of the bush. A spacer ring is intended to prevent the seal from being destroyed by mechanical overloading. The spacer ring is located between the bush and outer link plate.

Such a seal has the advantage that the joint is sealed in an "oil-tight" manner. This means that the chain joint can be filled with lubricants, such as oil or grease, and can thus be operated for a large period of time without any further maintenance. The joints are thus permanently lubricated. The oil is introduced via conventional lubricating bores in the pin.

Such link chains, however, are beset by a number of disadvantages.

The distance between the bush and outer link plate can give rise to a not inconsiderable amount of bending stress in the pin under load. Furthermore, an amount of pin deflection and therefore relatively pronounced edge pressure between the bush and the pin are to be expected. The bending of the pin and edge pressure, in turn, can result in reduced fatigue strength and a maximum-transfer level of tensile strength for the chain. Overall, a relatively large amount of wear and a relatively low breaking strength are to be expected.

Furthermore, the bush or the end side of the bush has to perform its tasks as sealing surface and bush. This requires a compromise in terms of the properties which are necessary in each case, in particular in respect of material and production, and this sometimes results in high-outlay production and increased material costs.

This also gives rise to a reduced contact surface area between the pin and outer link plate, in the case of the outer link plate having a cutout adjacent to the aforementioned contact surface area. Since the outer link plate is usually pressed onto the pin, a correspondingly smaller contact or joining surface area is the result, it therefore being possible for the press fit to transmit fewer forces and moments. Moreover, there is an increase in the bearing pressure here in the link-plate hole.

SUMMARY OF THE INVENTION

Accordingly, the object of the present invention is to propose an improved link chain, in particular to propose a link chain which overcomes at least one of the disadvantages outlined above, and preferably all of them, but at least provides improvements. In particular, the intention is to propose a link chain in which the bending stress and/or edge pressure to be expected in/on the pin can be reduced even just by design measures and/or in which, as far as the selection of material for, or the machining of, the bush is concerned fewer comprises, if any at all, resulting from the use of the end side of the bush as sealing surface have to be accepted, and/or in the case of which preferably the entire link-plate thickness contributes to the contact surface area.

This object is achieved according to the invention by a link chain having the characterizing features as disclosed herein. Since the sealing arrangement is arranged between the inner link plate and the outer link plate, the sealing arraignment can be shifted to a certain extent out of the region of the bush, or end side of the bush, into the region of the link plates. An oil-tight or lubricant-tight chain joint can be realized nevertheless. It is no longer the case, however, that the sealing arrangement butts against the end surface of the bush. Since the end side of the bush is then no longer required as sealing surface, there is no longer any need to accept compromises, for example as far as surface machining, selection of material, etc., are concerned, in respect of the bush or the end side thereof. In addition, the distance between the bush and outer link plate can be shortened, and therefore the bush can cover over the pin as far as the outer link plate. This helps to achieve better force transmission between the pin and bush and, generally speaking, the pin will undergo less deflection. There is also no need to provide, for example, a cutout, which reduces the contact surface area between the outer link plate and the pin. The entire thickness of the link plate can be used as a contact surface area. Since the sealing arrangement is arranged between the inner link plate and the outer link plate, and no longer between the end side of the bush and the outer link plate, the accommodating space for the seal is at a greater radial distance from the bush. This gives rise to a larger amount of "free space" between the seal and bush. This residual space can be filled with oil. Generally speaking, this gives rise to a relatively large lubricant reservoir, which extends the service life and maintenance intervals of the link chain.

Further advantageous configurations of the proposed invention can be gathered, in particular, from the features described herein. The subjects or features described herein can be combined with one another, in principle, as desired.

In an advantageous configuration of the invention, provision may be made for the sealing arrangement to be arranged radially outside the bush. Accordingly, the sealing arrangement no longer butts against the end surface of the bush. Since the end side of the bush is then no longer required as sealing surface, there is no longer any need to accept compromises, for example as far as surface machining, selection of material, etc., are concerned, in respect of the bush or the end side thereof. In addition, the distance between the bush and outer link plate can be shortened, and therefore the bush can cover over the pin as far as the outer link plate. This helps to achieve better force transmission between the pin and bush and, generally speaking, the pin will undergo less deflection. There is also no need to provide, for example, a cutout, which reduces the contact surface area between the outer link plate and the pin. Since the sealing arrangement is arranged between the inner link plate and the outer link plate, and no longer between the end side of the bush and the outer link plate, the accommodating space for the seal is at a greater radial distance from the bush. This gives rise to a larger amount of "free space" between the seal and bush. This residual space can be filled with oil. Generally speaking, this gives rise to a relatively large lubricant reservoir, which extends the service life and maintenance intervals of the link chain.

In a further advantageous configuration of the invention, provision may be made for the bush to have a projection projecting from the inner link plate in the direction of the outer link plate. Such a projection can be used to receive a thrust washer, which in turn may be part of the sealing arrangement. In addition, the projection can be used to achieve the situation where the pin is covered over to the maximum extent by the bush, and therefore, generally speaking, relatively large loads, in particular bending loads, can be absorbed by the pin. The projection acts, as it were, as a reinforcement for the pin. In addition, the projection can be used as a spacer ring for spacing the outer link plate apart from the inner link plate, in which case there is no pressing need for a separate spacer ring to be inserted.

In a further advantageous configuration of the invention, provision may be made for the end side of the bush to be arranged, in particular, directly in front of the outer link plate. There is, for example, no seal provided between the end side of the bush and outer link plate. Accordingly, the outer link plate can be supported on the end side of the bush, and this likewise helps to absorb relatively high bending loads acting on the pin. This also results in less bending of the pin and/or less edge pressure between the pin and bush. However, there is preferably a certain amount of play between the end side of the bush and outer link plate, so that the chain joint can rotate freely.

In a further advantageous configuration of the invention, provision may be made for the sealing arrangement to comprise a seal and a seal-accommodating space. The seal-accommodating space serves for accommodating the seal. Furthermore, the seal-accommodating space can be filled with lubricants, for example oil, grease, etc., and, accordingly, it serves as a reservoir for the lubrication of the chain joint.

In an advantageous configuration of the invention, provision may be made for the seal-accommodating space to be formed from a thrust washer and an accommodating washer. This variant constitutes one option for configuring the seal-accommodating space between the link plates. It is advantageously possible, in the case of this variant, for the sealing surface for the seal to be formed entirely by the thrust washer. To this extent, no particular attention has to be paid to the configuration of the link-plate surface as sealing surface, and there is therefore no need here for the link plate to be machined in any specific way. Accordingly, the accommodating washer can be designed for accommodating and/or retaining the seal.

In a further advantageous configuration of the invention, provision may be made for the seal-accommodating space to be formed from a thrust washer and an annular cutout, in particular in the outer link plate. This variant constitutes a further option for configuring the seal-accommodating space between the link plates, the separate accommodating washer being replaced, to a certain extent, by an annular cutout in one of the link plates. The advantage of this configuration resides in space being created. The inner and outer link plates can be located closer together, since part of the seal-accommodating space is incorporated in the link plate.

In a further advantageous configuration of the invention, provision may be made for the thrust washer or the accommodating washer to be fitted onto the projection of the bush. The projection of the bush, projecting from the inner link plate, can be used as a connection means for the thrust washer or the accommodating washer. This provides for straightforward and effective installation of the seal accommodated in the seal-accommodating space.

In a further advantageous configuration of the invention, provision may be made for a ring, in particular a metal ring, to be arranged in the seal-accommodating space. The metal ring can form, together with the seal, a labyrinth seal. The ring can also increase the size of the seal-accommodating space.

In a further advantageous configuration of the invention, provision may be made for the link plates to be formed from semifinished products, in particular flat material or sheet metal. In the case of link plates being made from semifinished products, in particular flat material or sheet metal, even small numbers of items can be produced cost-effectively. Furthermore, it is possible to realize more or less any desired contours and sizes. Customer requirements can be met, and one-off production operations can be realized, easily and advantageously. However, it is likewise conceivable for the link plates to be forged link plates.

In a further advantageous configuration of the invention, provision may be made for the bush and/or the pin to be provided with a lubricant-introduction opening. Accordingly, it is possible for the chain joint can be filled with lubricant via said lubricant-introduction openings.

In a further advantageous configuration of the invention, provision may be made for the bush and/or the pin to be provided with lubricant-accommodating devices, in particular grooves, surfaces or bores. The lubricant-accommodating devices, which may be arranged, for example in the form of grooves, surfaces or bores, on the pin or the inner wall of the bush, serve as a reservoir for the lubricant within the chain joint. Ultimately, the link chain thus requires less maintenance or, possibly, even becomes maintenance-free.

In a further advantageous configuration of the invention, provision may be made for the seal-accommodating space to be filled with a lubricant, in particular oil or grease. The seal-accommodating space can serve as a lubricant reservoir for the chain joint and ensure the long-term lubrication of the latter.

Provision can advantageously be made here for the bush to have radial grooves on the end side. As a result, lubricant can be transported from the seal-accommodating space into the lubricant-accommodating devices, and vice versa.

BRIEF DESCRIPTION OF THE DRAWINGS

Further features and advantages of the present invention will become clear by way of the following description of preferred exemplary embodiments, with reference to the accompanying figures, in which.

Figure 1:
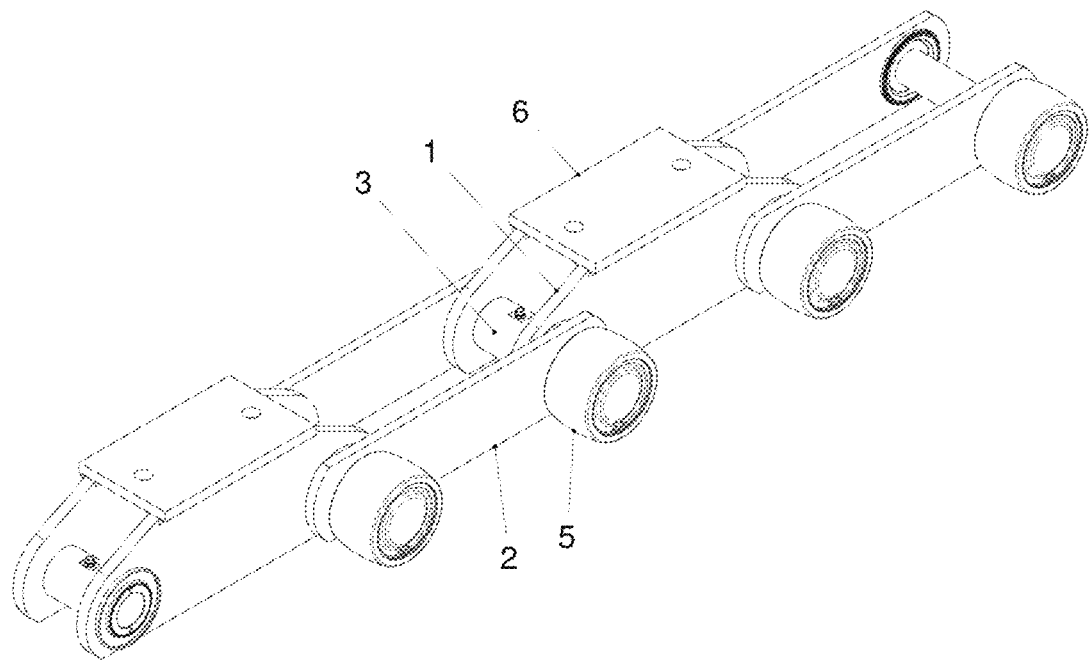
FIG. 1 shows a perspective illustration of a link chain according to the invention.

The following reference signs are used in the figures.
1 Inner link plate
2 Outer link plate
3 Bush
4 Pin
5 Roller
6 Connection element
7 Thrust washer
8 Cutout/annular groove
9 Seal
10 Ring
11 Seal-accommodating space
12 Accommodating washer
13 Cutout
31 Projection
32 Groove
41 Shoulder
42 Channel
43 Lubricant-introduction opening
44 Lubricant-accommodating device The construction of a link chain is sufficiently known to a person skilled in the art. A link chain, in particular a bush chain, is constructed essentially from two elements which are lined up beside one another. These elements are also referred to as an inner link and an outer link. An outer link usually comprises two outer link plates 2, which are connected to one another by two pins 4. An inner link is usually made up of two inner link plates 1, which are connected to one another by means of two bushes 3. A respective bush 3 and a pin 4 of adjacent chain links, the pin being inserted into the bush, form a chain joint. These joints allow the link chain for example to wrap around the chain wheels located in the drive train. The aforementioned embodiment forms a straightforward link chain. It is, of course, also conceivable to have more link plates per inner link and outer link. It is also conceivable to have fewer link plates per chain link, for example in the case of a bar-link or block-and-bar chain. The chain according to the invention can be provided with rectilinear or angled link plates. In particular all configurations of a bush conveyor chain are possible.

In an application as a conveyor chain, preferably extended pins 4 or bushes 3 are provided with corresponding rollers 5 and/or the link plates, in particular the inner link plates 1 and/or the outer link plates 2, are provided with corresponding connection elements 6. It is then possible for transport devices, for example platforms or the like, to be connected thereto.

It is possible to use in principle metallic materials for the link plates, pins and bushes. However, non-metallic materials such as high-strength plastics, etc., are also conceivable. It is possible for the link plates to be produced from semifinished products, in particular flat material or sheet metal, or also in the form of forgings or castings. It is also possible to use injection molding or 3D printing from plastic or other suitable materials. Provision is also preferably made for the end of the pin to be provided with a shoulder 41 for connection to the outer link plate 2. The resulting stop provides for very precise installation of the outer link plates 2.

The region which is essential to the present invention is the region between an inner link plate 1 and an outer link plate 2. To this extent, the link chain according to the invention comprises at least one inner link plate 1 with a bush 3 and also one outer link plate 2 with a pin 4. The pin 4 is inserted into the bush 3 and forms a chain joint. The link chain according to the invention also has a sealing arrangement, which is provided for sealing the chain joint formed from the bush 3 and pin 4.

The invention provides for the sealing arrangement to be arranged between the inner link plate 1 and the outer link plate 2, in particular radially outside the bush 3.

A sealing arrangement of a link chain according to the invention essentially comprises a seal-accommodating space 11 and a seal 9, which is accommodated in the seal-accommodating space 11. Accordingly, the seal-accommodating space 11 is arranged between the link plates 1, 2 and radially outside the bush 3.

The seal-accommodating space 11 serves, in particular, for accommodating the seal 9 and can be designed in different ways.

Figure 2:
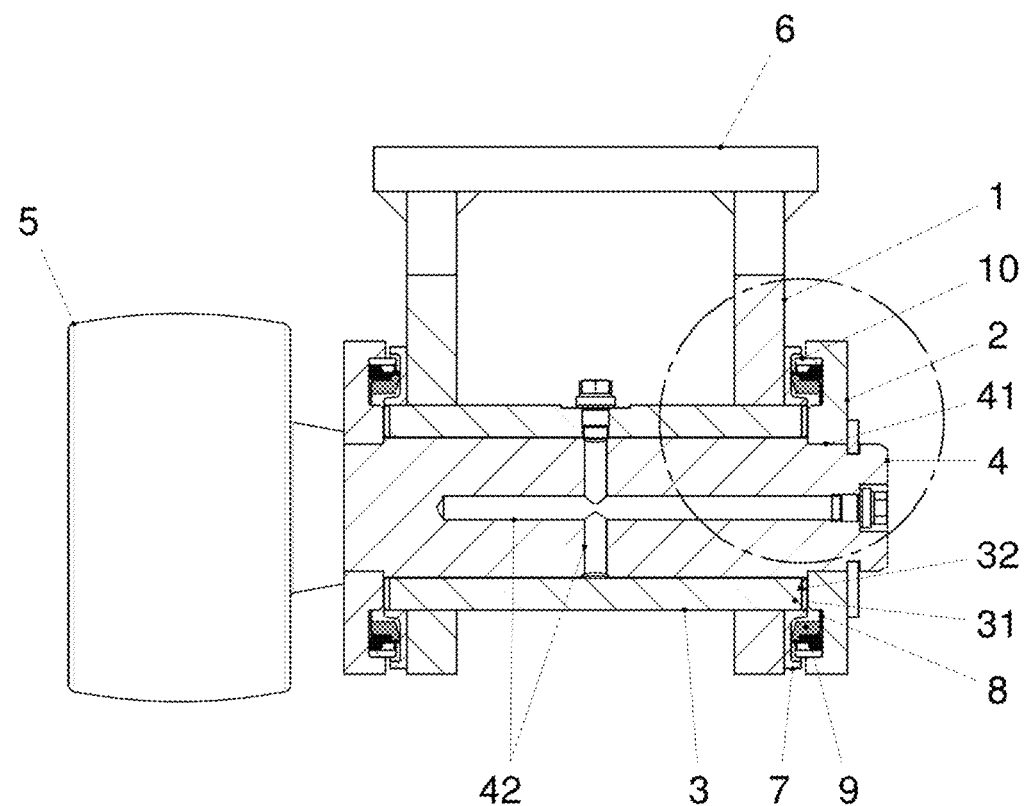
FIG. 2 shows a cross-sectional illustration of a link chain according to the invention with a cutout and a thrust washer, which form the seal-accommodating space.
Figure 3:
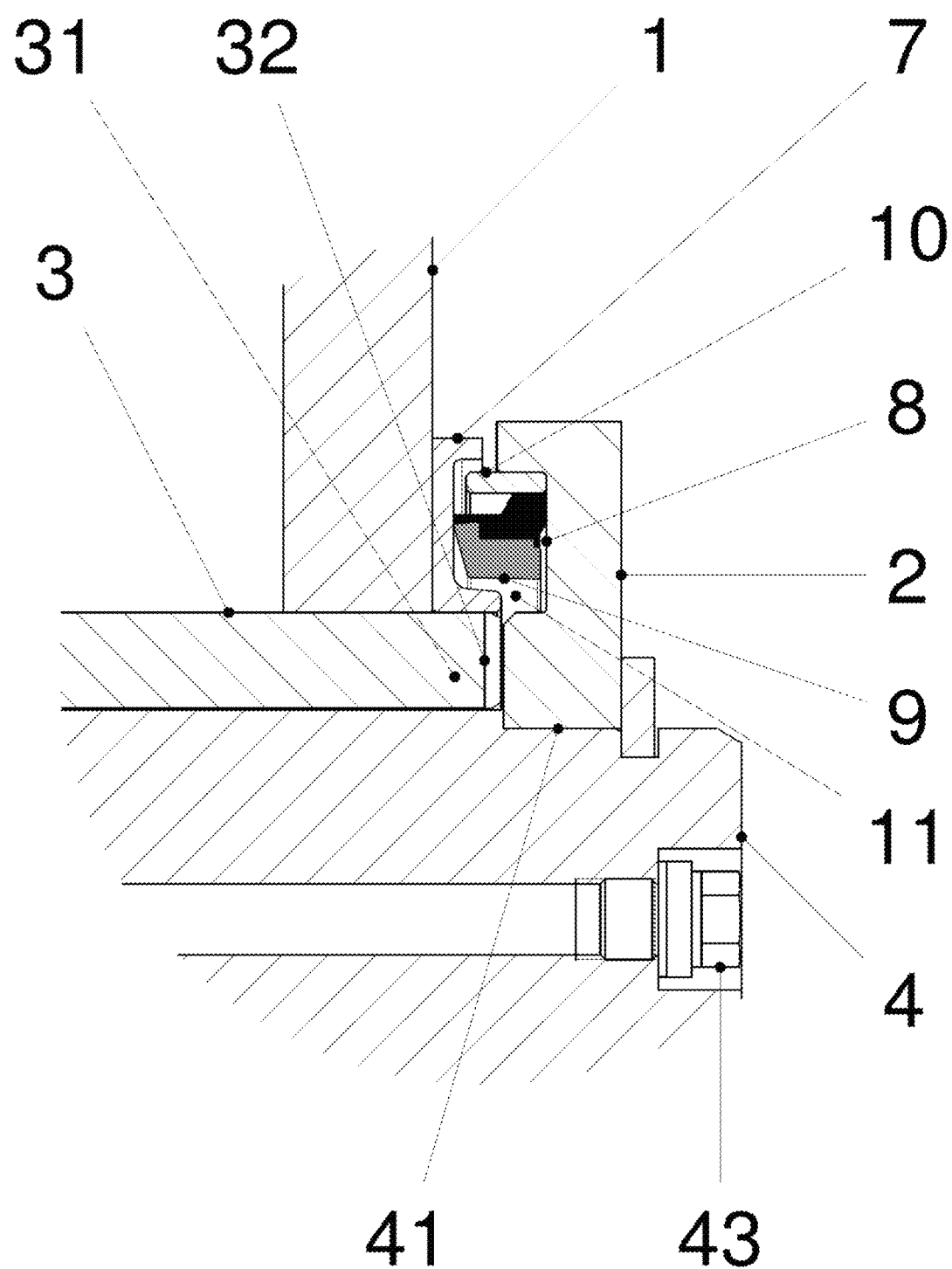
FIG. 3 shows an enlarged illustration of a detail from FIG. 2.

In a preferred embodiment, the seal-accommodating space comprises a thrust washer 7 and an annular cutout 8. It is preferable for the cutout 8 to be arranged in the outer link plate 2 and for the thrust washer 7 to be arranged in front of the inner link plate 1. Such an embodiment is illustrated, in particular, in FIGS. 2 and 3. However, it is also conceivable, in principle, to have a converse arrangement.

Figure 7A:
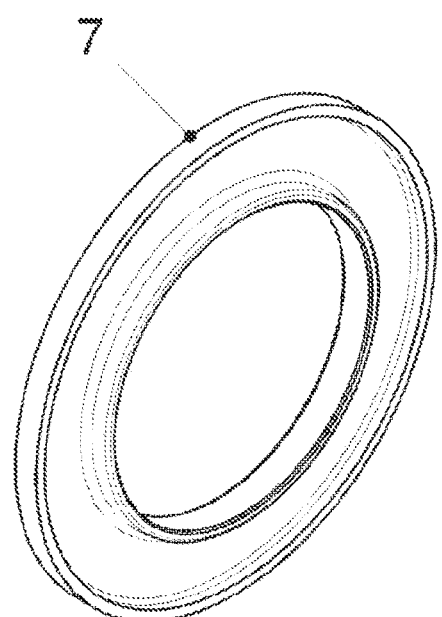
FIGS. 7A and 7B show perspective illustrations of a thrust washer, respectively designed with a channel-like cross section and with an L-shaped cross section.
Figure 7B:
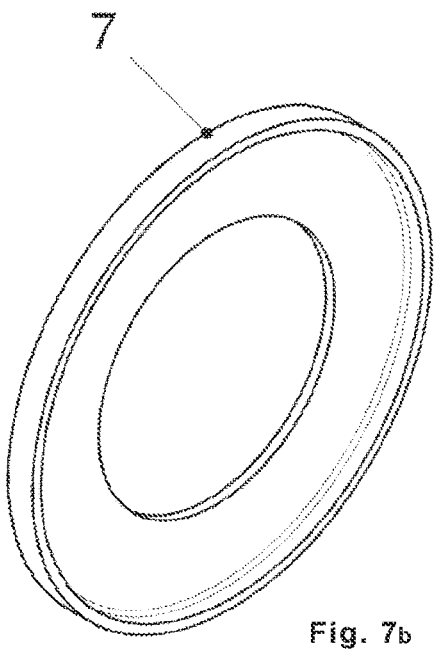

The thrust washer 7, which could also be referred to as a thrust ring, preferably has approximately a cross section in the form of a box-like channel, as shown in FIG. 7A. In other words, as seen in cross section, the thrust washer 7 has a rectilinear base side and two legs extending from the base side, in particular from the ends thereof. The legs may be of different lengths. It is also possible for the thrust washer 7 to be shaped in other ways. For example, it can be a flat configuration, that is to say with a rectangular cross section. An L-shaped cross section is also conceivable, as shown in FIG. 7B.

Provision is preferably made for the bush 3 to be provided with a projection 31, in other words a projection as a measure from the end of the bush to the surface of the inner link plate 1, which could also be referred to as a protrusion and projects from the inner link plate. The thrust washer 7 is preferably fitted onto said projection, projecting from the inner link plate 1 and belonging to the bush 3, and, accordingly, is arranged in front of the inner link plate 1. The inner radius of the sealing arrangement, in particular of the seal, is preferably greater than the outer radius of the bush, in particular of the projection of the bush. The thrust washer 7 is preferably fastened by a press fit on the bush 3 or the projection 31, or by some other force-fitting or form-fitting method. In addition to accommodating the thrust washer 7, the projection 31 can perform the function of a spacer ring and protects the seal 9 against mechanical overloading.

The annular cutout 8, which could also be referred to as an annular groove, is likewise in the form of a box-like channel in cross section; to this extent, the cutout 8 preferably has a base and two side surfaces perpendicular thereto.

In an installed state, the thrust washer 7 and the annular cutout 8 have their respective openings located opposite one another, and this results in a seal-accommodating space 11 between the thrust washer 7 and the annular cutout 8.

Figure 4:
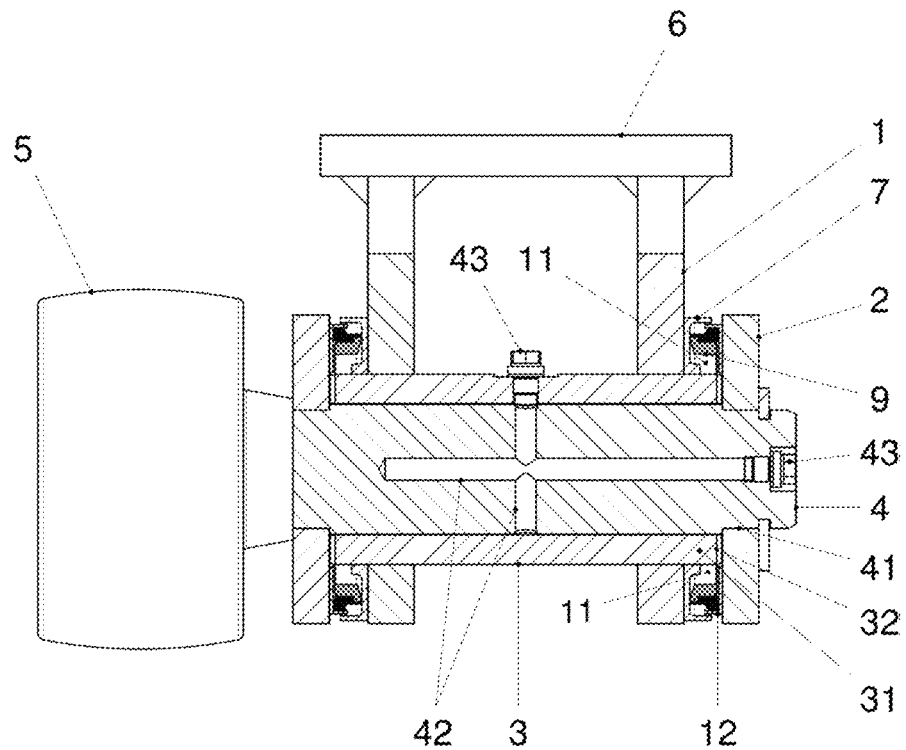
FIG. 4 shows a cross-sectional illustration of a further embodiment of a link chain according to the invention, this time with a thrust washer and an accommodating washer, which form the seal-accommodating space.
Figure 8:
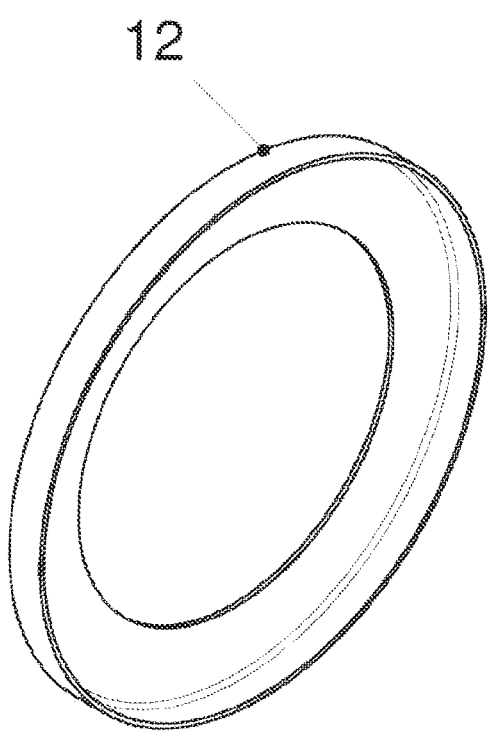
FIG. 8 shows a perspective illustration of an accommodating washer.

As an alternative, the seal-accommodating space 11 can also be formed by a thrust washer 7 and an accommodating washer 12, as shown in FIG. 8. In this case, there is no annular cutout in the link plate. In this case, the accommodating washer, which could also be referred to as an accommodating ring, serves predominantly for retaining the seal 9 within the seal-accommodating space 11. Here too, the thrust washer 7 and accommodating washer 12 can optionally be arranged, respectively, on the inner link plate 1 and outer link plate 2. However, it is preferable for the thrust washer 7 to be arranged in front of the inner link plate 1 and for the accommodating washer 12 to be arranged in front of the outer link plate 2. Such an embodiment is illustrated in FIG. 4. In addition, the thrust washer 7, together with the accommodating washer 12, forms a labyrinth, or a labyrinth seal, which protects the seal 9.

Figure 5:
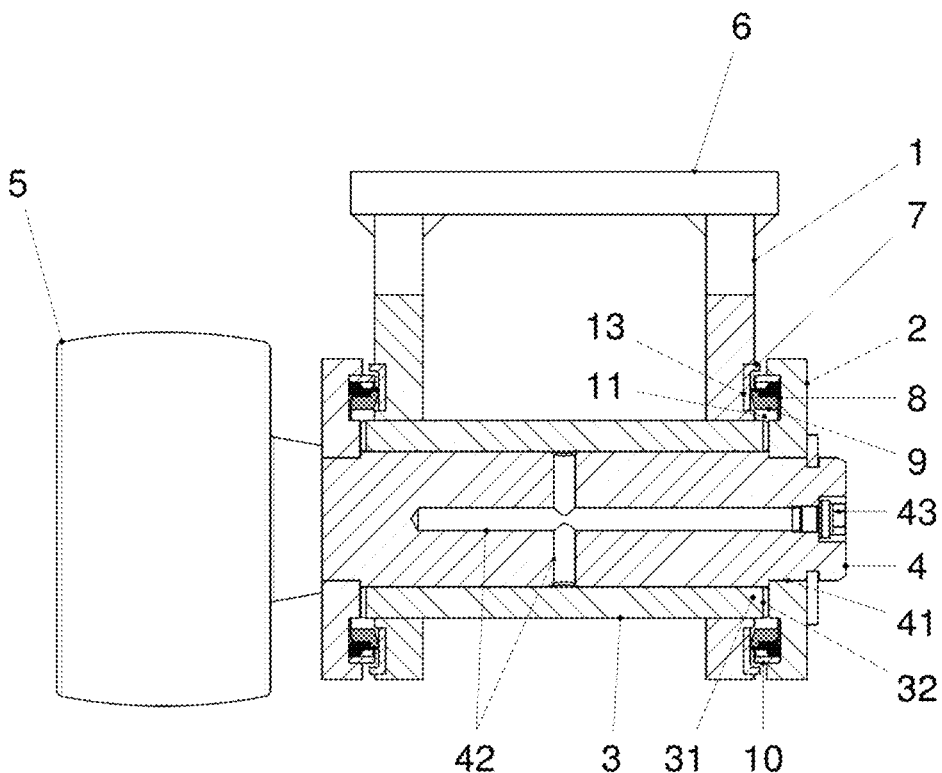
FIG. 5 shows a cross-sectional illustration of a further embodiment of a link chain according to the invention, this time with a cutout and a thrust washer accommodated in a cutout, which form the seal-accommodating space.

As a further alternative, it is also possible for the seal-accommodating space 11 to be formed by an annular cutout 8 and a thrust washer 7 accommodated in an annular cutout 13. It is preferable for the annular cutout 8 to be provided in the outer link plate 2 and for the annular cutout 13 with the thrust washer 7 to be provided in the inner link plate 1. Such an embodiment is illustrated in FIG. 5. The thrust washer 7 used here has, for example, an L-shaped cross section.

As a result, in particular in conjunction with the aforementioned exemplary embodiments, this gives a seal-accommodating space 11, preferably with a rectangular cross section, which goes around the region of the bush 3 and/or the projection 31 of the bush. It is essentially the case that the thrust washer 7 performs the function of a sealing surface, in other words that surface against which the seal presses and is in frictional contact. The seal 9 and the thrust washer 7 and/or machined link-plate surface preferably give an outwardly oil-tight, but at least predominantly oil-tight, sealing arrangement. It is possible to use preferably steel, stainless steel or case-hardened steel for the thrust washer 7. A variety of options are conceivable here. The elements forming the sealing surface in each case, in other words the thrust washer 7, should meet a number of requirements. They should be hardened and finely machined, in order to prevent rapid wear of the seal, but also of the thrust washer 7 itself. Coating or some other mechanical machining operation is also conceivable. The surface roughness of the sealing surface of the thrust washer is preferably not at a particularly high level. The surface roughness can be set by suitable machining measures. Ultimately, however, the machining, and production, of a thrust washer in the form of a sealing surface is easier than corresponding machining of the link plate to form a sealing surface. It is also the case here that no particular attention has to be paid to the selection of the link-plate material in relation to whether the latter is suitable as the sealing surface, since the sealing surface is provided by a separate part, in this case the thrust washer. It is also conceivable for the respective link-plate surface, instead of the thrust washer, to be machined appropriately in order to be able to serve as a sealing surface. It is possible here for the respective link-plate surface to be machined, for example, by coating, but other machining methods such as hardening, heat treatment, mechanical machining, etc., are also possible.

The annular cutout 8 or the accommodating washer 12 serves predominantly for retaining the seal 9 within the seal-accommodating space.

The seal 9 is preferably a sealing ring or annular seal. The seal 9 is intended to prevent dirt from penetrating into the chain joint and to prevent lubricant/oil from escaping from the chain joint. The seal 9 should have appropriate resilient features so that there is always a defined amount of contact/pressure between the seal 9 and the respective sealing surface. This could also be achieved by a separate resilient element. It is possible for the seal 9 to be, for example, a seal which comprises 3 components.

Figure 9:
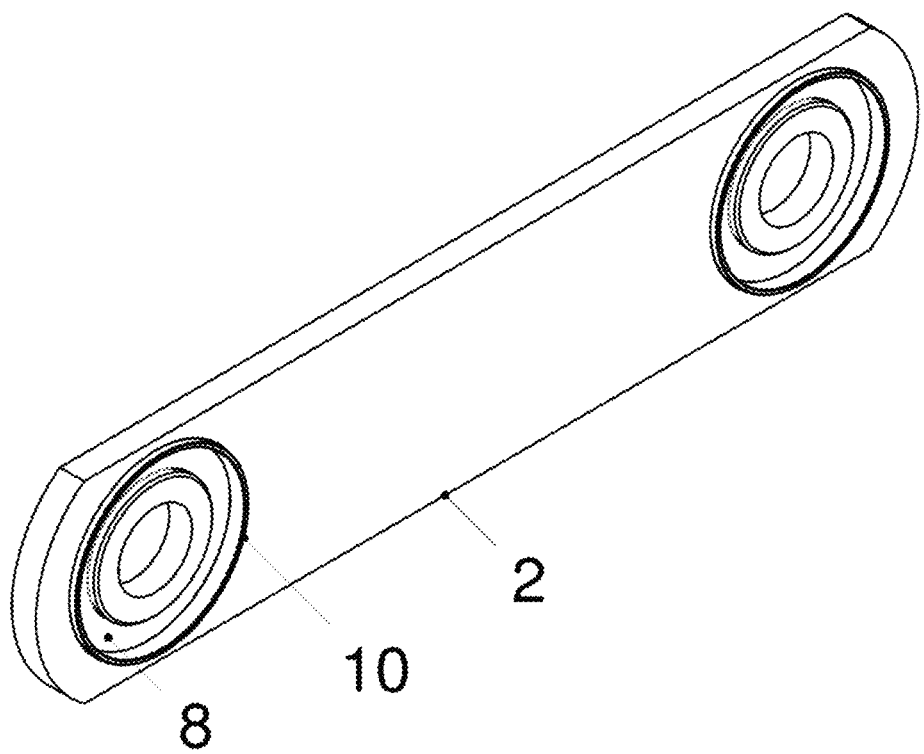
FIG. 9 shows a perspective illustration of a link plate with cutouts and a respective ring inserted therein.
Figure 10:
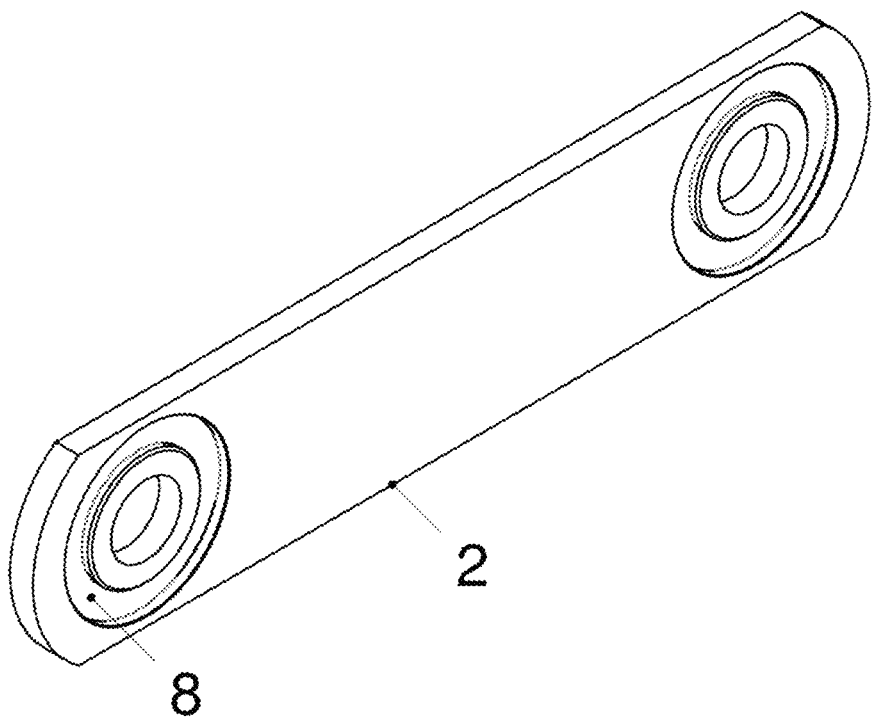
FIG. 10 shows a perspective illustration of a link plate with cutouts.

Referring to FIGS. 9 and 10, in addition to the seal 9, it is also possible for a ring 10, preferably a metal ring, to be inserted into the seal-accommodating space 11. The ring 10, for example together with the thrust washer 7 or the leg of the thrust washer, can form a labyrinth seal. However, a different pairing, for example together with the annular cutout of the opposite link plate, is also conceivable. In addition, the ring 10 can function as an installation aid and/or as mechanical protection for the seal 9. The bush 3 or the projection 31 contributes to limiting the amount of axial play by abutment against the outer link plate 2.

As already outlined above, the seal 9 seals the chain joint in a lubricant-tight manner to a technically feasible extent. To this extent, the chain joint can be filled with lubricant. Examples of possible lubricants here are oil and grease.

Figure 6:
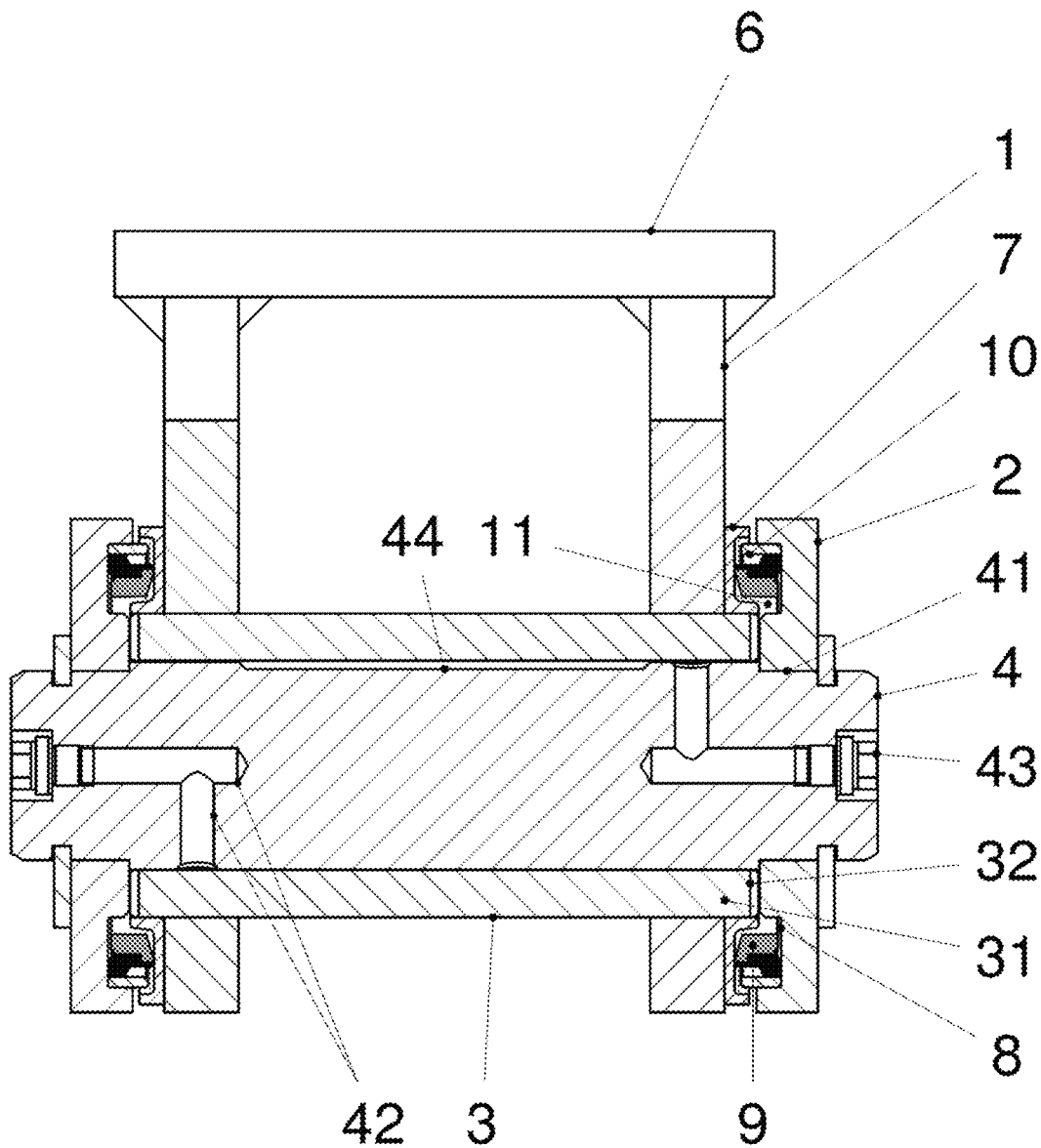
FIG. 6 shows a cross-sectional illustration of a link chain according to the invention with a cutout and a thrust washer, which form the seal-accommodating space.

The lubricant is preferably introduced via lubricant-introduction openings 43, which can be provided in the bush 3 and/or the pin 4. In the exemplary embodiment according to FIGS. 2 and 3, for example, lubricant-introduction openings 43 are provided both in the pin and in the bush. In the embodiment according to FIG. 6, for example two lubricant-introduction openings 43 are provided in both end sides of the pin 4.

Provision may also be made for the bush 3 and/or the pin 4 to be provided with lubricant-accommodating devices 44, for example grooves, surfaces or bores. It is essentially the case that the lubricant-accommodating devices 44 serve to keep the lubricant between the bush 3 and pin 4. It is preferably the case that channels 42 are provided in the pin 4 and the bush 3, between the lubricant-introduction openings 43 and the lubricant-accommodating devices 44, it being possible for the lubricant introduced to pass through said channels to the lubricant-accommodating devices 44. The lubricant-introduction openings 43 can be closed, for example, by means of suitable nipples or screws. It is also the case that the channels 42 as such can serve as reservoirs for lubricant. Ultimately, the lubricant is distributed within the chain joint.

Provision is preferably also made for the seal-accommodating space 11 to be filled with a lubricant. The lubricant accommodated here serves essentially as a lubricant reservoir for the chain joint and for wetting the seal with lubricant. Provision may preferably be made here for the bush 3 to have radial grooves 32 on the end side. These grooves 32 allow lubricant to be exchanged between the seal-accommodating space and the chain joint.

What is claimed is:

1. A link chain comprising:
an inner link plate with a bush,
an outer link plate with a pin,
wherein the pin and bush form a chain joint,
wherein a sealing arrangement is provided for sealing the chain joint,
wherein the sealing arrangement is arranged between the inner link plate and the outer link plate and
wherein the sealing arrangement comprises a seal and a seal-accommodating space,
wherein the seal-accommodating space is formed from a thrust washer and an annular cutout in the outer link plate, wherein a ring, which is designed in the form of a metal ring, is arranged in the seal-accommodating space, wherein said metal ring forms, together with the thrust washer, to form a continuous flow path, creating a labyrinth seal located radially outside the sealing arrangement seal for mechanically protecting for the sealing arrangement seal, or wherein the seal-accommodating space is formed from a thrust washer and an accommodating washer, wherein said thrust washer, together with the an accommodating washer, to form a continuous path, creating a labyrinth seal located radially outside the sealing arrangement seal for mechanically protecting for the sealing arrangement seal.

2. The link chain according to claim 1, wherein the sealing arrangement is arranged radially outside the bush.

3. The link chain according to claim 1, wherein the bush is provided with a projection, which projects from the inner link plate.

4. The link chain according to claim 3, wherein the thrust washer or the accommodating washer is fitted onto the projection of the bush.

5. The link chain according to claim 1, wherein the end side of the bush is arranged in front of the outer link plate.

6. The link chain according to claim 1, wherein the link plates are formed from semifinished products.

7. The link chain according to claim 6 wherein the semifinished products are selected from the group consisting of a flat material and sheet metal.

8. The link chain according to claim 1, wherein the bush and/or the pin are/is provided with at least one lubricant-introduction opening.

9. The link chain according to claim 1, wherein the bush and/or the pin are/is provided with lubricant-accommodating devices.

10. The link chain according to claim 1, wherein the bush has radial grooves on the end side.

11. The link chain according to claim 1, wherein the seal-accommodating space is filled with a lubricant oil.

12. The link chain according to claim 1 wherein the link chain is a bush chain.

13. The link chain according to claim 9 wherein the lubricant-accommodating devices are selected from the group consisting of grooves, surfaces and bores.

14. The link chain according to claim 12 wherein the lubricant is oil.

* * * * *